US012761901B2

(12) United States Patent
Sun

(10) Patent No.: US 12,761,901 B2
(45) Date of Patent: Oct. 13, 2026

(54) HOME ALL-OPTICAL NETWORK GATEWAY VERSION UPGRADING METHOD, ELECTRONIC DEVICE, AND STORAGE MEDIUM

(71) Applicant: ZTE CORPORATION, Shenzhen (CN)

(72) Inventor: Jian Sun, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 259 days.

(21) Appl. No.: 18/837,372

(22) PCT Filed: Jan. 3, 2023

(86) PCT No.: PCT/CN2023/070123
§ 371 (c)(1),
(2) Date: Aug. 9, 2024

(87) PCT Pub. No.: WO2023/151428
PCT Pub. Date: Aug. 17, 2023

(65) Prior Publication Data

US 2025/0190205 A1 Jun. 12, 2025

(30) Foreign Application Priority Data

Feb. 10, 2022 (CN) ......................... 202210124401.2

(51) Int. Cl.
*G06F 8/65* (2018.01)
*G06F 8/61* (2018.01)
(Continued)

(52) U.S. Cl.
CPC .................. *G06F 8/65* (2013.01); *G06F 8/63* (2013.01); *G06F 8/71* (2013.01); *H04B 10/27* (2013.01)

(58) Field of Classification Search
CPC .... H04B 10/27; H04Q 11/0067; H04Q 11/00; G06F 8/65; G06F 8/61; G06F 8/63;
(Continued)

(56) References Cited

U.S. PATENT DOCUMENTS 9,535,680 B2 * 1/2017 Elmoalem .......... H04Q 11/0067
12,621,516 B2 * 5/2026 Dolan .............. H04N 21/26291

FOREIGN PATENT DOCUMENTS

CN 1599344 A 3/2005
CN 1859182 A 11/2006
(Continued)

OTHER PUBLICATIONS

Cambium Networks, Quick Start Guide Fiber OLT and ONT, 39 pages (Year: 2026).*
(Continued)

*Primary Examiner* — Thuy Dao
(74) *Attorney, Agent, or Firm* — Vivacqua Crane, PLLC

(57) ABSTRACT

A method for version upgrading of a gateway in home all-optical network, an electronic apparatus, and a storage medium are disclosed. The method may include, determining a management entity identifier according to a software image management entity; sending the management entity identifier to an optical line terminal (OLT); receiving current gateway version information from the slave gateway, and mapping the current gateway version information to a corresponding software image management entity to update the software image management entity; determining response information, in response to a version acquisition instruction from the OLT, and sending the response information to the OLT; and receiving upgrade version information from the OLT, in response to an acknowledgement from the OLT that the response information meets a preset upgrade condition, and sending the upgrade version information to the slave
(Continued)

gateway, to enable the slave gateway to perform an upgrade according to the upgrade version information.

18 Claims, 11 Drawing Sheets

(51) Int. Cl.

| | |
|---|---|
| ***G06F 8/71*** | (2018.01) |
| ***G06F 9/44*** | (2018.01) |
| ***H04B 10/27*** | (2013.01) |
| ***H04L 9/40*** | (2022.01) |
| ***H04L 41/00*** | (2022.01) |
| ***H04L 41/0813*** | (2022.01) |
| ***H04L 67/00*** | (2022.01) |

(58) Field of Classification Search
CPC ...... G06F 8/71; G06F 9/4411; H04L 67/1095; H04L 41/082; G05B 19/042
See application file for complete search history.

(56) References Cited

FOREIGN PATENT DOCUMENTS

| | | | |
|---|---|---|---|
| CN | 100385862 | C | 4/2008 |
| CN | 108491222 | A | 9/2018 |
| CN | 112995806 | A | 6/2021 |
| KR | 20110059302 | A | 6/2011 |
| KR | 1020120066099 | A | 6/2012 |
| KR | 101233827 | B1 | 2/2013 |
| WO | 2010082363 | A1 | 7/2010 |

OTHER PUBLICATIONS

European Patent Office. Extended European Search Report for EP Application No. 23752208.1, mailed Feb. 14, 2025, pp. 1-10.
The State Intellectual Property Office of People's Republic of China. First Office Action and Search Report for CN Application No. 202210124401.2 and English translation, mailed May 19, 2026, pp. 1-12.
International Searching Authority. International Search Report and Written Opinion for PCT Application No. PCT/CN2023/070123 and English translation, mailed Feb. 22, 2023, pp. 1-11.

* cited by examiner

HOME ALL-OPTICAL NETWORK GATEWAY VERSION UPGRADING METHOD, ELECTRONIC DEVICE, AND STORAGE MEDIUM

CROSS-REFERENCE TO RELATED APPLICATION

This application is a national stage filing under 35 U.S.C. § 371 of international application number PCT/CN2023/070123, filed Jan. 3, 2023, which claims priority to Chinese patent application No. 202210124401.2 filed Feb. 10, 2022. The contents of these applications are incorporated herein by reference in their entirety.

TECHNICAL FIELD

The present disclosure relates to, but is not limited to, the field of telecommunication, and in particular to a method for version upgrading of a gateway in a home all-optical network, an electronic apparatus, and a storage medium.

BACKGROUND

Gigabit-capable passive optical networks (GPON) technology is a passive optical network access technology based on ITU-T G.9xx standard. A GPON system includes an Optical Line Terminal (OLT) and several Optical Network Units (ONUs). ITU-T G.988 is an internationally accepted standard for ONU management and control interface (OMCI) which is a mandatory protocol for OLT management. The OMCI protocol is the underlying management protocol embedded in the GPON/XGPON system, which is used for the basic configuration of ONU's PON interface and is indispensable in the GPON/XGPON system.

The telecommunication industry has been continuously accelerating the upgrade of optical fiber bandwidth. Currently, most home networks have achieved optical fiber access. The global average penetration rate of optical fiber to the home has reached 65%, and the figure is 91.3% in China. The continuous improvement of optical fiber access and other network infrastructure has provided a solid information base for the prosperity of Internet services. At the same time, innovative service applications emerge in an endless stream, such as ultra-high-definition video, cloud VR, cloud games, online education, telecommuting, etc., which put forward higher and higher requirements for network bandwidth, delay, and jitter. Home all-optical network, also known as FTTR (Fiber to The Room), lays optical fibers in every room, and realizes interconnection with home gateway by deploying edge ONU, so as to enable the high-quality development of new service applications such as online education, home office and home entertainment to the greatest extent.

Currently, an OLT can only remotely upgrade the master gateway of the home all-optical network, but it can't remotely upgrade the slave gateway of the home all-optical network. It is only possible to upgrade the slave gateway through the local server, which causes the increased labor cost and time cost, and the poor operability.

SUMMARY

The following is a summary of the subject matter described herein. This summary is not intended to limit the scope of protection of the claims.

Provided are a method for version upgrading of a gateway in home all-optical network, an electronic apparatus, and a storage medium in some embodiments of the present disclosure.

According to a first aspect of the present disclosure, a method for version upgrading of a gateway in home all-optical network is provided. The method is applied to a master gateway. The method may include: determining a management entity identifier according to a software image management entity; where the software image management entity is created by preset registration information of a slave gateway, and the software image management entity is configured to store gateway version information of the slave gateway; sending the management entity identifier to an optical line terminal (OLT); receiving current gateway version information from the slave gateway, and mapping the current gateway version information to a corresponding software image management entity to update the software image management entity; determining response information, in response to a version acquisition instruction from the OLT, and sending the response information to the OLT. The version acquisition instruction is determined by the OLT according to the management entity identifier, and the response information may include the current gateway version information and first state information indicative of a gateway state of the slave gateway; and receiving upgrade version information from the OLT, in response to an acknowledgement from the OLT that the response information meets a preset upgrade condition, and sending the upgrade version information to the slave gateway, to enable the slave gateway to perform an upgrade according to the upgrade version information.

According to a second aspect of the present disclosure, a method for version upgrading of a gateway in home all-optical network is provided. The method is applied to an optical line terminal (OLT). The method may include: acquiring a management entity identifier from a master gateway; where the management entity identifier is determined by a software image management entity, the software image management entity is created by the master gateway according to preset registration information of a slave gateway, and the software image management entity is configured to store gateway version information of the slave gateway, the software image management entity is updated by the master gateway receiving current gateway version information from the slave gateway, and mapping the current gateway version information to the corresponding software image management entity; determining a version acquisition instruction according to the management entity identifier; sending the version acquisition instruction to the master gateway to acquire response information from the master gateway, where the response information may include the current gateway version information and first state information indicative of a gateway state of the slave gateway; and sending preset upgrade version information to the master gateway, in response to a determination that the response information meets a preset upgrade condition, to instruct the master gateway to send the upgrade version information to the slave gateway, and to instruct the slave gateway to perform an upgrade according to the upgrade version information.

According to a third aspect of the present disclosure, a method for version upgrading of a gateway in home all-optical network is provided. The method is applied to a slave gateway. The method may include: sending current gateway version information to a master gateway, to instruct the master gateway to map the current gateway version information to a corresponding software image management entity to update the software image management entity, where the software image management entity is created by the master gateway according to preset registration information of the slave gateway, and the software image management entity is configured to store the gateway version information of the slave gateway; receiving upgrade version information from the master gateway, in response to an acknowledgement from an optical line terminal (OLT) that response information meets a preset upgrade condition; where the response information is determined by the master gateway in response to a version acquisition instruction from the OLT, and the response information may include the current gateway version information, and first state information indicative of a gateway state of the slave gateway, and the version acquisition instruction is determined by the OLT according to the management entity identifier; and performing an upgrade according to the upgrading version information.

According to a fourth aspect of the present disclosure, a gateway is provided. The gateway may include a memory, a processor and a computer program stored in the memory and executable by the processor which, when executed by the processor, causes the processor to carry out the method according to the first aspect or the third aspect as described above.

According to a fifth aspect of the present disclosure, an electronic apparatus is provided. The electronic apparatus may include a memory, a processor, and a computer program stored in the memory and executable on the processor which, when executed by the processor, causes the processor to carry out the method according to the second aspect as described above.

According to a sixth aspect of the present disclosure, a computer-readable storage medium is provided. The computer-readable storage medium stores thereon a computer-executable program which, when executed by a processor causes the processor to carry out the method according to any one of the aspects as described above.

Other features and advantages of the present disclosure will be illustrated in the following description, and in part will be apparent from the description, or may be understood by practicing the present disclosure. The objects and other advantages of the present disclosure can be achieved and obtained by the structure particularly set forth in the description, claims and drawings.

BRIEF DESCRIPTION OF DRAWINGS

The drawings are intended to provide a further understanding of the technical scheme of the present disclosure, and constitute a part of the specification, and they are intended to illustrate the technical scheme of the present disclosure in conjunction with the embodiments of the present disclosure, but are not intended to limit the technical scheme of the present disclosure.

DETAILED DESCRIPTION

Figure 1:
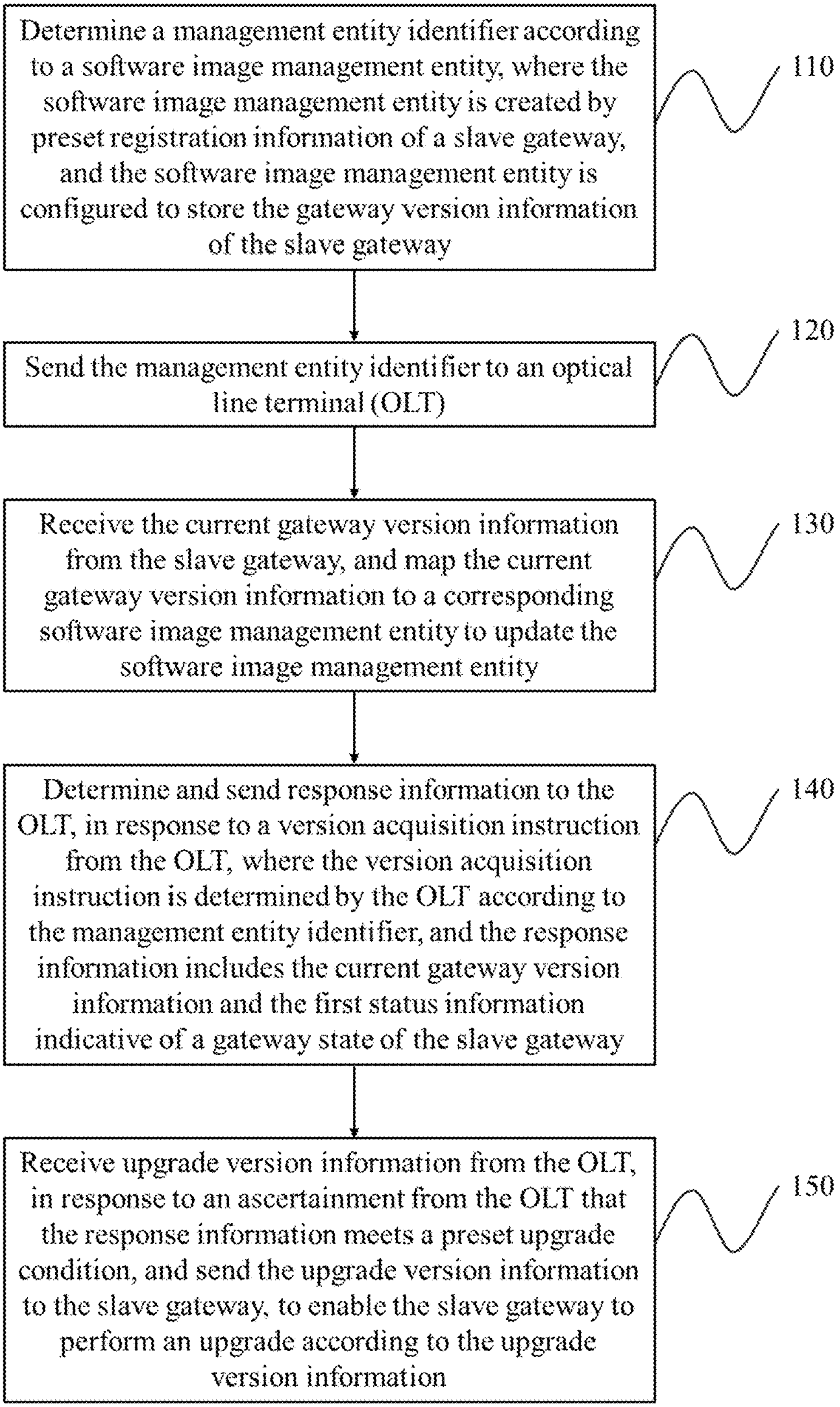
FIG. 1 depicts a flowchart showing a method for version upgrading of a gateway in home all-optical network applied to a master gateway according to an embodiment of the present disclosure.

The purpose, technical scheme and advantages of the present disclosure will become apparent through the following description for various embodiments in conjunction with the drawings. It should be understood that the embodiments described here are intended for illustration but not limitation to the present disclosure.

It should be noted that although the devices are shown with individual functional modules in the schematic diagram and the logical sequences are shown in the flow chart, in some cases, the devices can have different modules than those shown and the operations can be executed in a different order than those shown. The terms “first” and “second”, if used in the description, claims and the drawings are intended to distinguish similar objects, and does not necessarily imply any specific order or sequence.

Gigabit-capable passive optical networks (GPON) technology is a passive optical network access technology based on ITU-T G.9xx standard. A GPON system includes an Optical Line Terminal (OLT) and several Optical Network Units (ONUs). ITU-T G.988 is an internationally accepted standard for ONU management and control interface (OMCI) which is a mandatory protocol for OLT management. The OMCI protocol is the underlying management protocol embedded in GPON/XGPON system, which is used for the basic configuration of ONU’s PON interface and is indispensable in GPON/XGPON system.

The telecommunication industry has been continuously accelerating the upgrade of optical fiber bandwidth. Currently, most home networks have achieved optical fiber access. The global average penetration rate of optical fiber to the home has reached 65%, and the figure is 91.3% in China. The continuous improvement of optical fiber access and other network infrastructure has provided a solid information base for the prosperity of the Internet services. At the same time, innovative service applications emerge in an endless stream, such as ultra-high-definition video, cloud VR, cloud games, online education, telecommuting, etc., which put forward higher and higher requirements for network bandwidth, delay and jitter. Home all-optical network, also known as FTTR (Fiber to The Room), lays optical fibers in every room, and realizes interconnection with home gateway by deploying edge ONU, so as to enable the high-quality development of new service applications such as online education, home office and home entertainment to the greatest extent.

Currently, an OLT can only remotely upgrade the master gateway of the home all-optical network, but it can't remotely upgrade the slave gateway of the home all-optical network. It is only possible to upgrade the slave gateway through the local server, which causes the increased labor cost and time cost, and the poor operability.

In view of the incapability in remote version upgrade for a slave gateway in a home all-optical network, the present disclosure provides a method for version upgrading of a gateway in home all-optical network, an electronic apparatus, and a storage medium in some embodiments. The method includes: determining a management entity identifier according to a software image management entity; where the software image management entity is created by preset registration information of a slave gateway, and the software image management entity is configured to store gateway version information of the slave gateway; sending the management entity identifier to an optical line terminal (OLT); receiving current gateway version information from the slave gateway, and mapping the current gateway version information to a corresponding software image management entity to update the software image management entity; determining response information, in response to a version acquisition instruction from the OLT, and sending the response information to the OLT. The version acquisition instruction is determined by the OLT according to the management entity identifier, and the response information includes the current gateway version information and first state information indicative of a gateway state of the slave gateway; and receiving upgrade version information from the OLT, in response to an acknowledgement from the OLT that the response information meets a preset upgrade condition, and sending the upgrade version information to the slave gateway, to enable the slave gateway to perform an upgrade according to the upgrade version information. According to the scheme set forth in various embodiments of the present disclosure, the OLT can determine whether the slave gateway meets the upgrade condition by a mapping of the current gateway version information of the slave gateway to the software image management entity created by the master gateway. If so, the upgrade version information is sent to the master gateway, and then is forwarded to the slave gateway. Thus, the remote version upgrade of the slave gateway in the home all-optical network is realized and the labor cost and time cost are reduced.

Firstly, some terms involved in the present disclosure are illustrated below.

Gigabit-capable passive optical network (GPON) is the latest generation broadband passive optical integrated access standard based on ITU-T G.984.x standard, which exhibits many advantages such as high bandwidth, high efficiency, large coverage and rich user interfaces.

Optical Line Terminal (OLT) refers to the terminal equipment configured to connect optical fiber trunk lines.

Optical Network Unit (ONU) is classified into active optical network unit and passive optical network unit.

Management entity (ME) can provide management functions.

Management Information Base (MIB) refers to the collection of standard variable definitions of monitored network devices.

ONU management and control interface (OMCI) is a protocol for information interaction between OLT and ONU defined in GPON standard, which is intended for ONU management by OLT in GPON networks, including configuration management, fault management, performance management and security management.

ONU management and control channel (OMCC), refers to a channel that carries OMCI messages.

Optical Distribution Network (ODN) provides optical transmission channel between OLT and ONUs.

Passive Optical Network (PON) refers to (optical distribution network) do not contain any electronic devices and electronic power supply, and the components in the ODN are all passive devices such as optical splitters, without expensive active electronic equipment.

Several embodiments of the present disclosure will be further illustrated with reference to the drawings.

FIG. 1 depicts a flowchart showing a method for version upgrading of a gateway in home all-optical network according to an embodiment of the present disclosure. The method can be applied to a master gateway, and includes but is not limited to the following operations.

At operation 110, a management entity identifier is determined according to a software image management entity, where the software image management entity is created by preset registration information of a slave gateway, and the software image management entity is configured to store the gateway version information of the slave gateway.

At operation 120, the management entity identifier is sent to an optical line terminal (OLT).

At operation 130, the current gateway version information is received from the slave gateway and the current gateway version information is mapped to a corresponding software image management entity to update the software image management entity.

At operation 140, response information is determined and is sent to the OLT, in response to a version acquisition instruction from the OLT, where the version acquisition instruction is determined by the OLT according to the management entity identifier, and the response information includes the current gateway version information and the first state information indicative of a gateway state of the slave gateway.

At operation 150, upgrade version information is received from the OLT, in response to an acknowledgement from the OLT that the response information meets a preset upgrade condition, and the upgrade version information is sent to the slave gateway, to enable the slave gateway to perform an upgrade according to the upgrade version information.

It can be understood that, a user needs to input the registration information of the slave gateway into the master gateway. The master gateway creates the software image management entity according to the registration information of the slave gateway, and determines the management entity identifier. After determining the management entity identifier, the master gateway sends the management entity identifier to the OLT. The master gateway can automatically discover an online slave gateway and establish an OMCC channel with the slave gateway. The slave gateway sends the current gateway version information to the master gateway. The master gateway maps the current gateway version information to the established software image management entity. When the remote version upgrade of the slave gateway is ready, the OLT determines the upgrade sequence of the slave gateways according to the management entity identifier, upgrades the slave gateways according to a certain sequence and issues version acquisition instructions. The OLT determines the corresponding version acquisition instruction according to the management entity identifier and sends it to the master gateway. The master gateway responds to the version acquisition instructions sent by the OLT and replies the OLT with the response information. When determining the upgrade condition is met based on the response information, the OLT issues upgrade version information to the master gateway. The upgrade version information is forwarded to the slave gateway. The slave gateway performs the upgrade according to the upgrade version information. On this basis, the OLT can determine whether the slave gateway meets the upgrade condition by a mapping of the current gateway version information of the slave gateway to the software image management entity created by the master gateway. If so, the upgrade version information is sent to the master gateway, and then is forwarded to the slave gateway. Thus, the remote version upgrade of the slave gateway in the home all-optical network is realized and the labor cost and time cost are reduced.

It is noted that each slave gateway corresponds to the Managed Entity ID, MEID) of two software image management entities (software image ME). The Software image ME corresponding to one Software image MEID is in the activated state, and the Software image ME corresponding to the other Software image MEID is in the standby state. During the version upgrade for the slave gateway, the upgrade version information is updated to the Software image ME in the standby state. When the slave gateway is in the standby state, the slave gateway updates the upgrade version information in the standby Software image ME to the Software image ME in the activated state to complete the version upgrade of the slave gateway.

It should be noted that the master gateway can automatically discover an online slave gateway and establish an OMCC channel with the slave gateway, which is a technology well known to those having ordinary skills in the art and will not be described here.

In an embodiment, the OLT is under the management of the network management system. The OLT acquires the version upgrade instruction from the network management system. When the registration information of the slave gateway is updated, for example, the registration information of a slave gateway is added, the master gateway creates a new software image management entity, determines the corresponding management entity identifier, and then sends the new management entity identifier to the OLT.

In an embodiment, after operation 110 described in the embodiment shown in FIG. 1, the method further includes but is not limited to the following operations.

Determining the mapping relationship between registration information and management entity identifier.

It can be understood that any mapping relationship is consisted of one piece of registration information and two management entity identifiers. Since the registration information corresponds to the slave gateway, the corresponding slave gateway can be identified by the management entity identifier, and based on the mapping relationship.

In an embodiment, the master gateway creates and maintains a relationship table for representing the mapping relationship between registration information and management entity identifier. When the registration information of the slave gateway changes, the master gateway updates the data of the relationship table. When the master gateway is powered off and restarted, the data of the relationship table will not be lost, and the master gateway can still obtain the relationship table.

Figure 2:
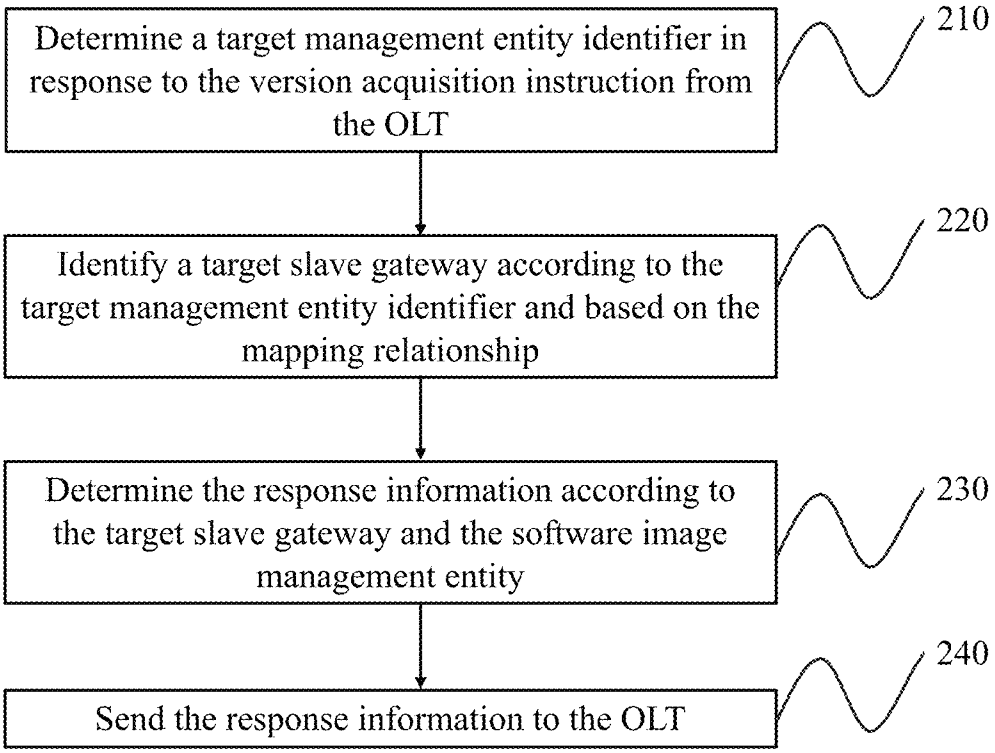
FIG. 2 depicts a flowchart showing a method for determining response information according to another embodiment of the present disclosure.

Referring to FIG. 2, in an embodiment, operation 140 discussed in the embodiment shown in conjunction with FIG. 1 further includes, but is not limited to, the following operations.

At operation 210, a target management entity identifier is determined in response to the version acquisition instruction from the OLT.

At operation 220, a target slave gateway is identified according to the target management entity identifier and based on the mapping relationship.

At operation 230, the response information is determined according to the target slave gateway and the software image management entity.

At operation 240, the response information is sent to the OLT.

It can be understood that since the version acquisition instruction is determined by the OLT according to the management entity identifier, the master gateway can determine the target management entity identifier according to the version acquisition instruction. Any mapping relationship is consisted of one piece of registration information and two management entity identifiers. Since the registration information corresponds to the slave gateway, the master gateway can identify the target slave gateway based on mapping relationship by determining the target management entity identifier. The current gateway version information in the response information is determined by the software image management entity. The first state information in the response information is determined by the target slave gateway.

Figure 3:
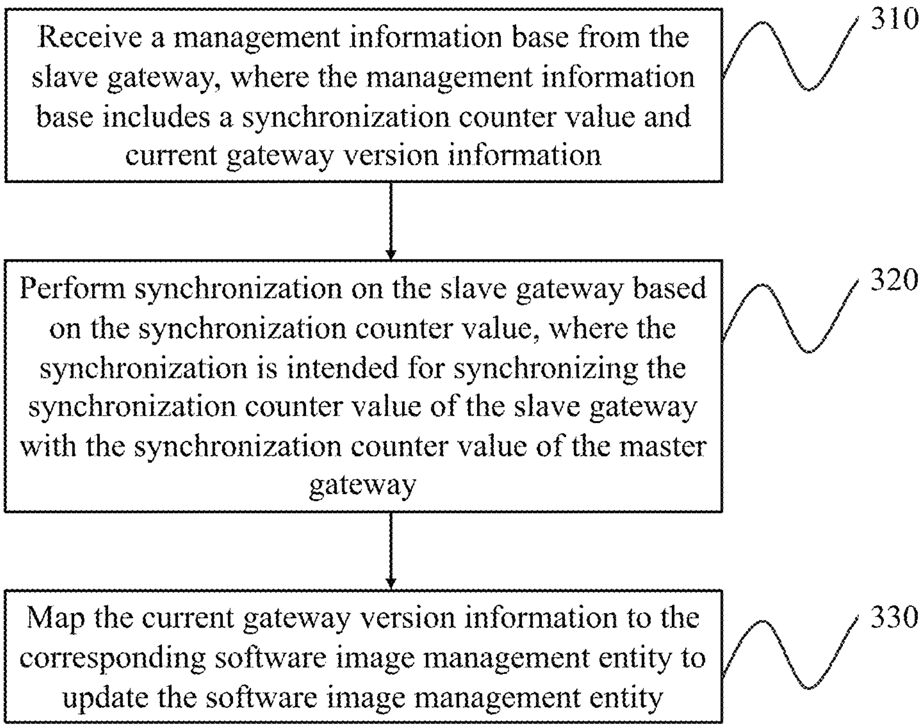
FIG. 3 depicts a flowchart showing a method for updating a software image management entity according to another embodiment of the present disclosure.

Referring to FIG. 3, in an embodiment, operation 130 discussed in the embodiment shown in conjunction with FIG. 1 further includes, but is not limited to, the following operations.

At operation 310, a management information base is received from the slave gateway, where the management information base includes a synchronization counter value and current gateway version information.

At operation 320, synchronization is performed on the slave gateway based on the synchronization counter value, where the synchronization is intended for synchronizing the synchronization counter value of the slave gateway with the synchronization counter value of the master gateway.

At operation 330, the current gateway version information is mapped to the corresponding software image management entity to update the software image management entity.

It can be understood that before uploading the current gateway version information by the slave gateway, the MIB of the slave gateway needs to be synchronized with the MIB of the master gateway. Synchronization refers to the synchronization of the synchronization counter value of the MIB such that the synchronization counter values of the master gateway and the slave gateway are the same. After the synchronization is done, the slave gateway reports the current gateway version information to the master gateway. The master gateway maps the current gateway version information to the corresponding software image management entity to update the software image management entity.

Figure 4:
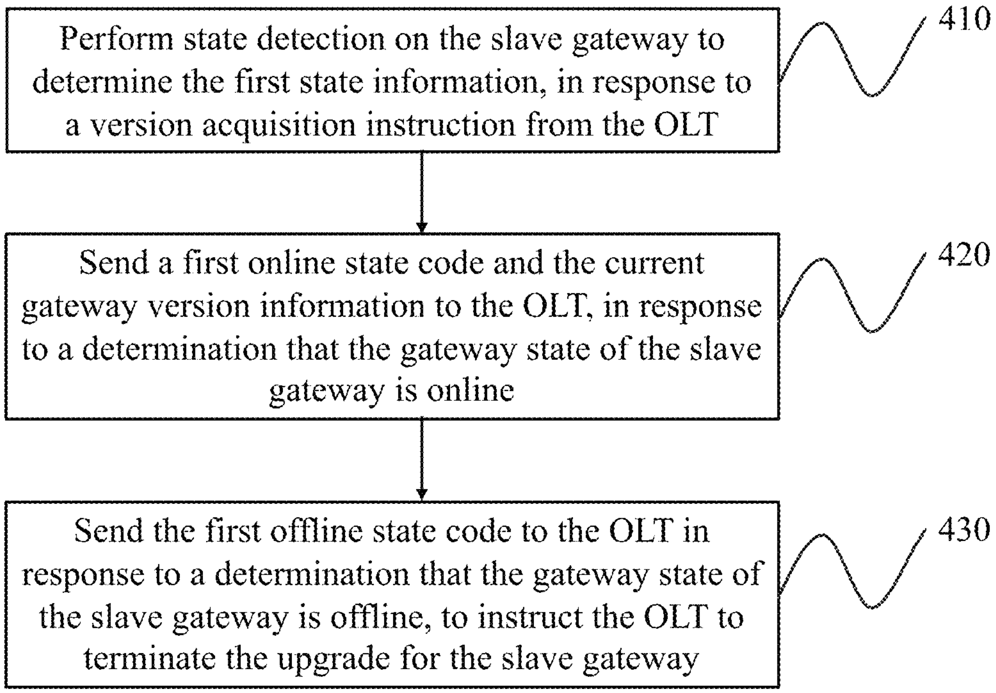
FIG. 4 depicts a flowchart showing the determination of an upgrade condition according to another embodiment of the present disclosure.

According to an embodiment, the gateway state of the slave gateway includes online state and offline state. The first state information includes a first online state code and a first offline state code. As shown in FIG. 4, operation 140 discussed in the embodiment shown in FIG. 1 further includes, but is not limited to, the following operations.

At operation 410, state detection is performed on the slave gateway to determine the first state information, in response to a version acquisition instruction from the OLT.

At operation 420, a first online state code and the current gateway version information are sent to the OLT, in response to a determination that the gateway state of the slave gateway is the online state.

At operation 430, the first offline state code is sent to the OLT in response to a determination that the gateway state of the slave gateway is the offline state, to instruct the OLT to terminate the upgrade for the slave gateway.

It can be understood that, the OLT needs to acquire the current version information of the slave gateway before remote upgrade for the slave gateway is performed. Before sending the current version information, the master gateway conducts state detection on the slave gateway corresponding to the version acquisition instruction to determine the first state information. When the slave gateway is to be offline, it is only necessary to send the first offline state code to the OLT to stop the version upgrade. When the slave gateway is online, the first online state code and the current gateway version information are sent to the OLT.

In an embodiment, the items of the first state information are shown in the following Table 1:

based on the response information, and the second state information is indicative of a gateway state of the slave gateway, and includes a second online state code and a second offline state code.

At operation 520, a second offline state code is sent to the OLT in response to a determination that the gateway state of the slave gateway is the offline state, to instruct the OLT to stop upgrading the slave gateway.

At operation 530, a download initialization instruction is sent to the slave gateway to acquire initialization information from the slave gateway, in response to a determination that the gateway state of the slave gateway is the online state; and a second online state code and the initialization information are sent to the OLT, to perform operation 150.

It can be understood that the process of sending the upgrade version information from the optical line terminal to the slave gateway includes: determining firstly, the number of segments in each image window containing the upgrade version information, i.e., the window size, and then receiving by the slave gateway, all segments in the image window according to the window size value. The window size is determined by negotiation between the OLT and the slave gateway. The determination of the window size are as follows.

First, the OLT sends a download initialization instruction, i.e., a Start software download instruction. Upon receiving the download initialization instruction, the master gateway performs state detection on the slave gateway corresponding to the download initialization instruction to determine the second state information. When the slave gateway is to be offline, it is only necessary to send the second offline state code to the OLT to stop the version upgrade. When the slave gateway is online, the second online state code and initialization information are sent to the OLT to complete the

TABLE 1

| Field | Byte | 8 | 7 | 6 | 5 | 4 | 3 | 2 | 1 | Explanation: result, reason |
|---|---|---|---|---|---|---|---|---|---|---|
| Information content | 9 | 0 | 0 | 0 | 0 | x | x | x | x | 0000, the command was processed successfully.<br>0001, command processing error<br>0010, command not supported<br>0011, parameter error<br>0100, unknown managed entity<br>0101, unknown managed entity instance<br>0110, the equipment is busy<br>1001, property failed or unknown.<br>1111, the edge ONU is offline. |

In Table 1, results 0000, 0001, 0010, 0011, 0100, 0101, 0110 and 1001 belong to the first online state code, and result 1111 belongs to the first offline state code.

In an embodiment, the upgrade condition includes that the current gateway version information is different from the upgrade version information, and the OLT has received the first online state code from the master gateway.

Figure 5:
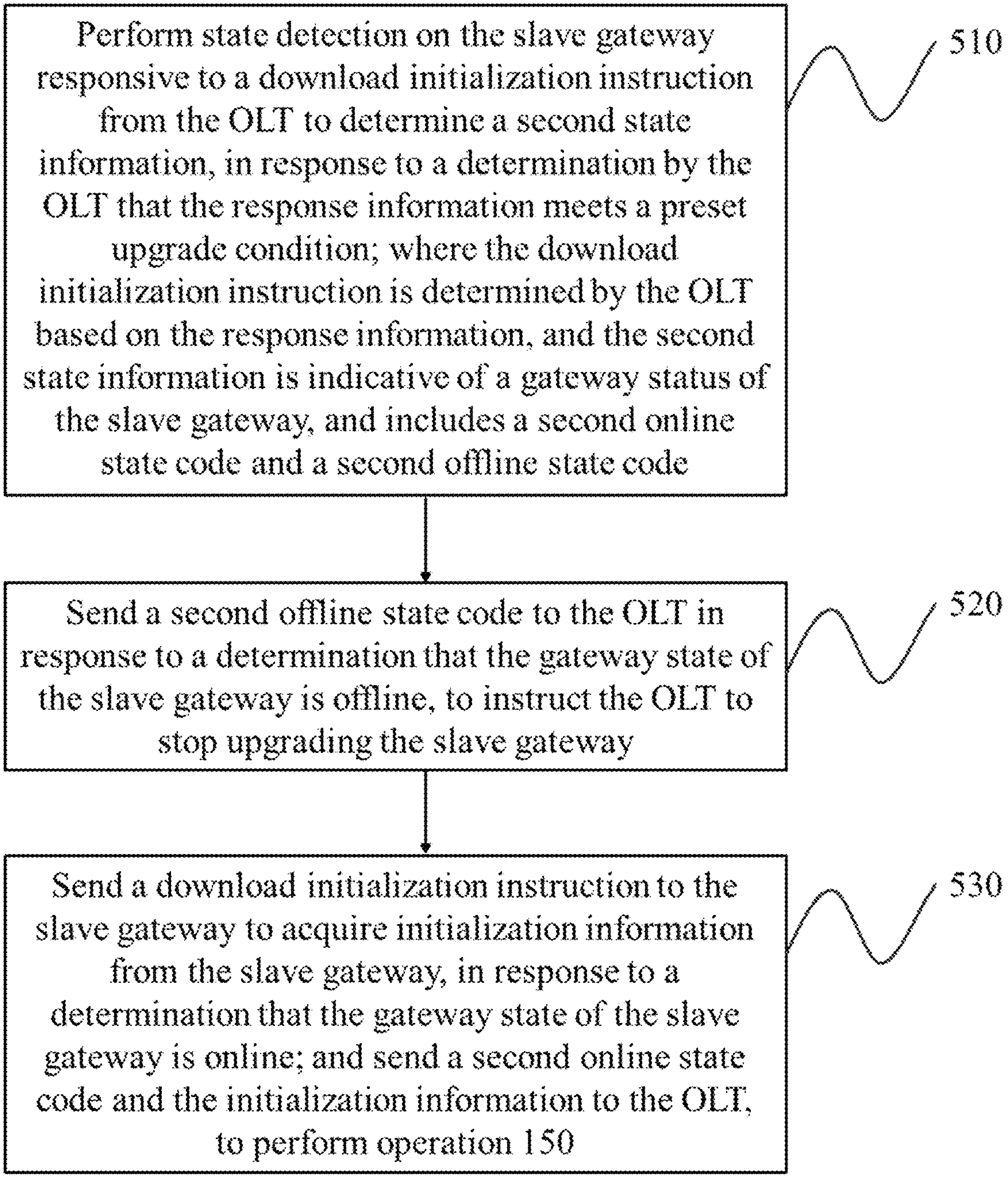
FIG. 5 depicts another flow chart showing the determination of an upgrade condition according to another embodiment of the present disclosure.

In an embodiment, the gateway state of the slave gateway includes an online state and an offline state. As shown in FIG. 5, the method further includes but is not limited to the following operations before operation 150 discussed in the embodiment shown in FIG. 1.

At operation 510, state detection is performed on the slave gateway responsive to a download initialization instruction from the OLT to determine a second state information, in response to a determination by the OLT that the response information meets a preset upgrade condition; where the download initialization instruction is determined by the OLT determination of the window size. After the window size is determined, the OLT sends the segmented version upgrade information to the master gateway, i.e., the Download section instruction which is then forwarded by the master gateway to the slave gateway. If all segments in an image window are successfully received by the slave gateway, an “confirmed” acknowledgment should be sent in the response information of the Download section instruction. If not all segments are successfully received, a “denial” acknowledgment should be sent. Upon receiving the “denial” acknowledgment, the OLT can retransmit the image window or stop the download process by sending an End software download instruction. At any time before the download process is completed, if the slave gateway goes offline, the master gateway will send an offline state code to the OLT in response to the instruction from the OLT to stop the version upgrade.

In an embodiment, the items of the second state information are shown in the following table 2:

TABLE 2

| Field | Byte | 8 | 7 | 6 | 5 | 4 | 3 | 2 | 1 | Explanation: result, reason |
|---|---|---|---|---|---|---|---|---|---|---|
| Information content | 9 | 0 | 0 | 0 | 0 | x | x | x | x | 0000, the command was processed successfully.<br>0001, command processing error<br>0010, command not supported<br>0011, parameter error<br>0100, unknown managed entity<br>0101, unknown managed entity instance<br>0110, the equipment is busy<br>1111, the edge ONU is offline. |

In Table 2, results 0000, 0001, 0010, 0011, 0100, 0101, and 0110 belong to the second online state code, and result 1111 belongs to the second offline state code.

Figure 6:
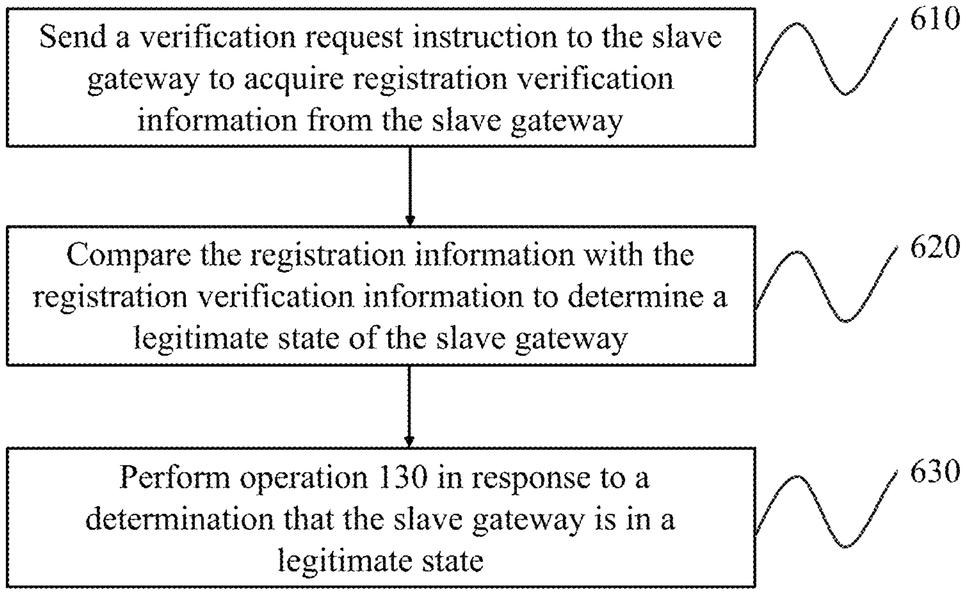
FIG. 6 depicts a flowchart showing the determination of a legitimate state according to another embodiment of the present disclosure.

In an embodiment, the gateway state of the slave gateway includes an online state and an offline state. As shown in FIG. 6, the method further includes but is not limited to the following operations before operation 130 discussed in the embodiment shown in FIG. 1.

At operation 610, a verification request instruction is sent to the slave gateway to acquire registration verification information from the slave gateway.

At operation 620, the registration information is compared with the registration verification information to determine a legitimate state of the slave gateway.

At operation 630, operation 130 is performed in response to a determination that the slave gateway is in a legitimate state.

It can be understood that, the registration information includes Serial Number (SN) and Password. The master gateway supports any verification method based on the serial number, password and serial number plus password to authenticate the legitimation of the slave gateway and determine the legitimate state of the slave gateway.

In an embodiment, based on one of the above verification methods, after the master gateway sends a verification request instruction to the slave gateway, the slave gateway sends preset registration verification information to the master gateway. The master gateway compares the registration information with the registration verification information. The case where the registration information and the registration verification information are the same, indicates that the slave gateway is in a legitimate state. When the registration information is different from the registration verification information, it means that the slave gateway is in an illegitimate state. The master gateway will only establish an OMCC channel with the slave gateway in the legitimate state to ensure reliability and security.

Figure 7:
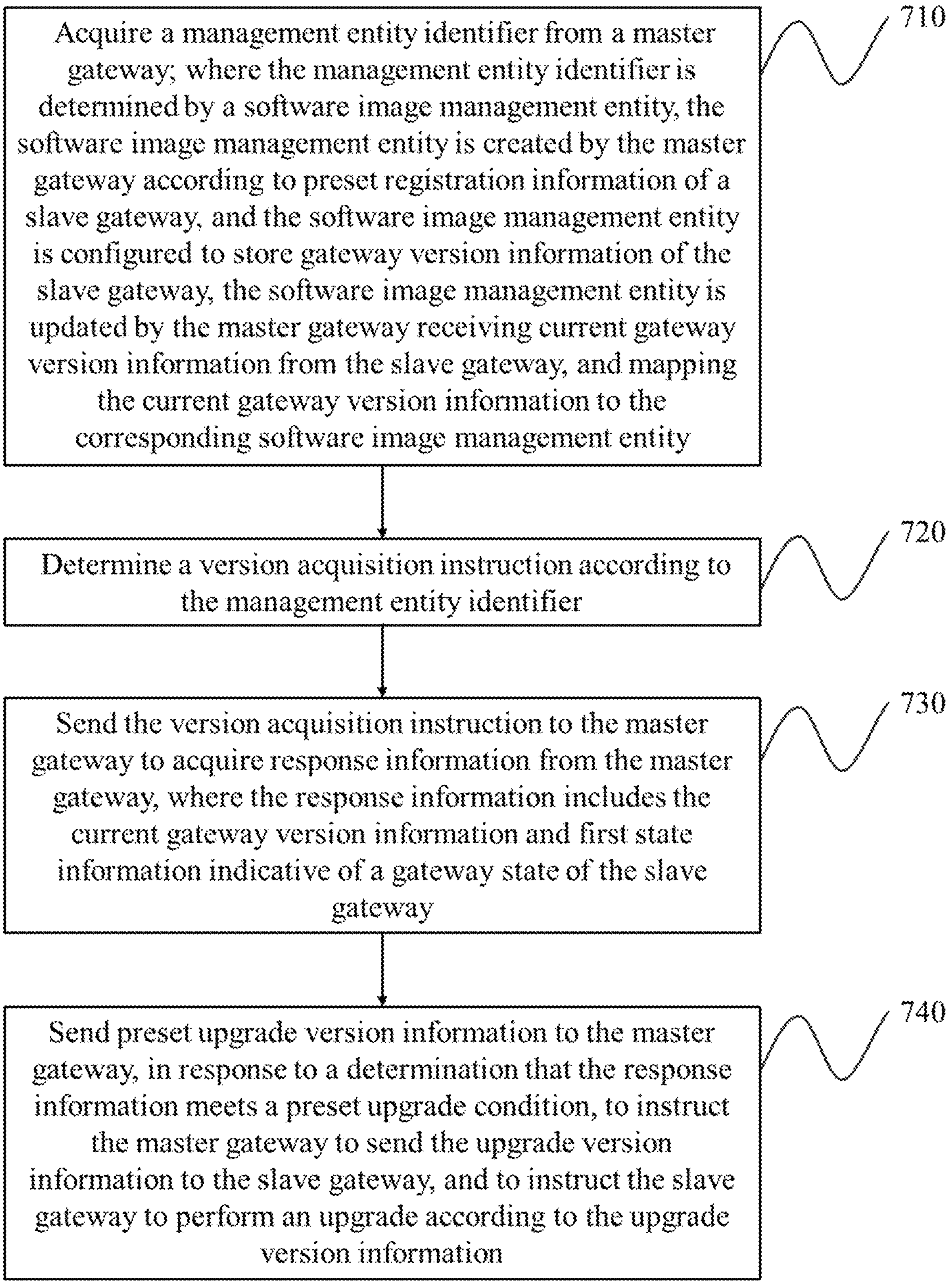
FIG. 7 depicts a flowchart showing a method for version upgrading of a gateway in home all-optical network applied to an OLT according to another embodiment of the present disclosure.

FIG. 7 depicts a flowchart showing a method for version upgrading of a gateway in home all-optical network according to an embodiment of the present disclosure. The method can be applied to an OLT, and includes but is not limited to the following operations.

At operation 710, a management entity identifier is acquired from a master gateway; where the management entity identifier is determined by a software image management entity, the software image management entity is created by the master gateway according to preset registration information of a slave gateway, and the software image management entity is configured to store gateway version information of the slave gateway, the software image management entity is updated by the master gateway receiving current gateway version information from the slave gateway, and mapping the current gateway version information to the corresponding software image management entity.

At operation 720, a version acquisition instruction is determined according to the management entity identifier.

At operation 730, the version acquisition instruction is sent to the master gateway to acquire response information from the master gateway, where the response information includes the current gateway version information and first state information indicative of a gateway state of the slave gateway.

At operation 740, preset upgrade version information is sent to the master gateway, in response to a determination that the response information meets a preset upgrade condition, to instruct the master gateway to send the upgrade version information to the slave gateway, and to instruct the slave gateway to perform an upgrade according to the upgrade version information.

It can be understood that, after determining the management entity identifiers, the master gateway sends the management entity identifiers to the OLT. When the remote version upgrade of the slave gateway is ready, the OLT determines the upgrade sequence of the slave gateways according to the management entity identifiers, determines the corresponding version acquisition instructions and sends them to the master gateway. The master gateway determines a currently-to-be-processed slave gateway according to the management entity identifier corresponding to the version acquisition instruction and generates response information. When determining that the upgrade condition is met, the OLT sends the upgrade version information to the master gateway which forwards the information to the slave gateway. The slave gateway performs the version upgrade according to the upgrade version information. On this basis, the OLT can determine whether the slave gateway meets the upgrade condition by a mapping of the current gateway version information of the slave gateway to the software image management entity created by the master gateway. If so, the upgrade version information is sent to the master gateway, and then is forwarded to the slave gateway. Thus, the remote version upgrade of the slave gateway in the home all-optical network is realized and the labor cost and time cost are reduced.

Figure 8:
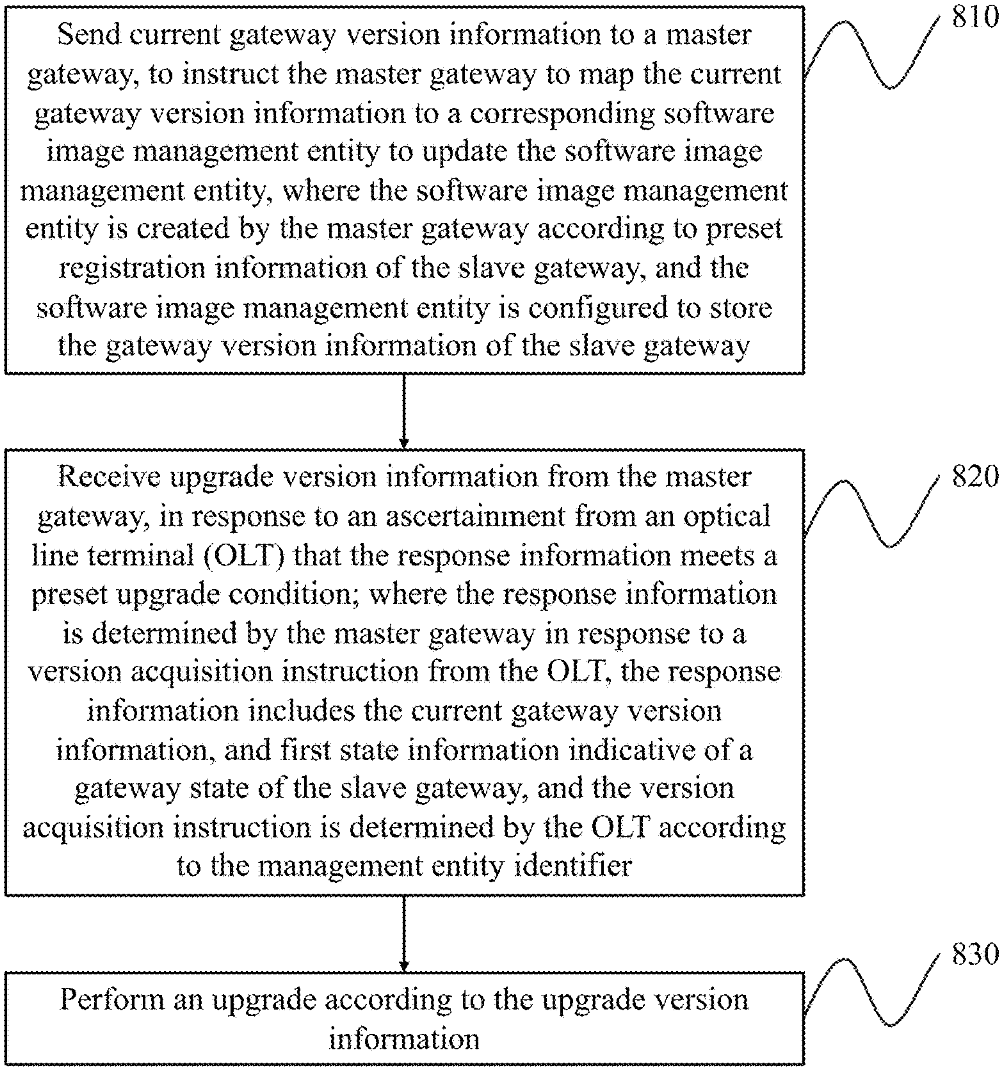
FIG. 8 depicts a flowchart showing a method for version upgrading of a gateway in home all-optical network applied to a slave gateway according to another embodiment of the present disclosure.

FIG. 8 depicts a flowchart showing a method for version upgrading of a gateway in home all-optical network according to another embodiment of the present disclosure. The method can be applied to a slave gateway, and includes but is not limited to the following operations.

At operation 810, current gateway version information is sent to a master gateway, to instruct the master gateway to map the current gateway version information to a corresponding software image management entity to update the software image management entity, where the software image management entity is created by the master gateway according to preset registration information of the slave gateway, and the software image management entity is configured to store the gateway version information of the slave gateway.

At operation 820, upgrade version information is received from the master gateway, in response to an ascertainment from an optical line terminal (OLT) that the response information meets a preset upgrade condition; where the response information is determined by the master gateway in response to a version acquisition instruction from the OLT, and the response information includes the current gateway version information, and first state information indicative of a gateway state of the slave gateway, and the version acquisition instruction is determined by the OLT according to the management entity identifier.

At operation 830, an upgrade is performed according to the upgrade version information.

It can be understood that, after the slave gateway is online and establishes OMCC with the master gateway, the slave gateway sends the current gateway version information to the master gateway. The master gateway maps the current gateway version information to the created software image management entity, and responds to the version acquisition instruction issued by the OLT. Also, the master gateway determines the slave gateway to be processed according to the management entity identifier corresponding to the version acquisition instruction, and generates response information. When determining that the upgrade condition is met, the OLT sends the upgrade version information to the master gateway, which is forwarded to the slave gateway. The slave gateway performs the upgrade according to the upgrade version information. On this basis, the OLT can determine whether the slave gateway meets the upgrade condition by a mapping of the current gateway version information of the slave gateway to the software image management entity created by the master gateway. If so, the upgrade version information is sent to the master gateway, and then is forwarded to the slave gateway. Thus the remote version upgrade of the slave gateway in the home all-optical network is realized and the labor cost and time cost are reduced.

Figure 9:
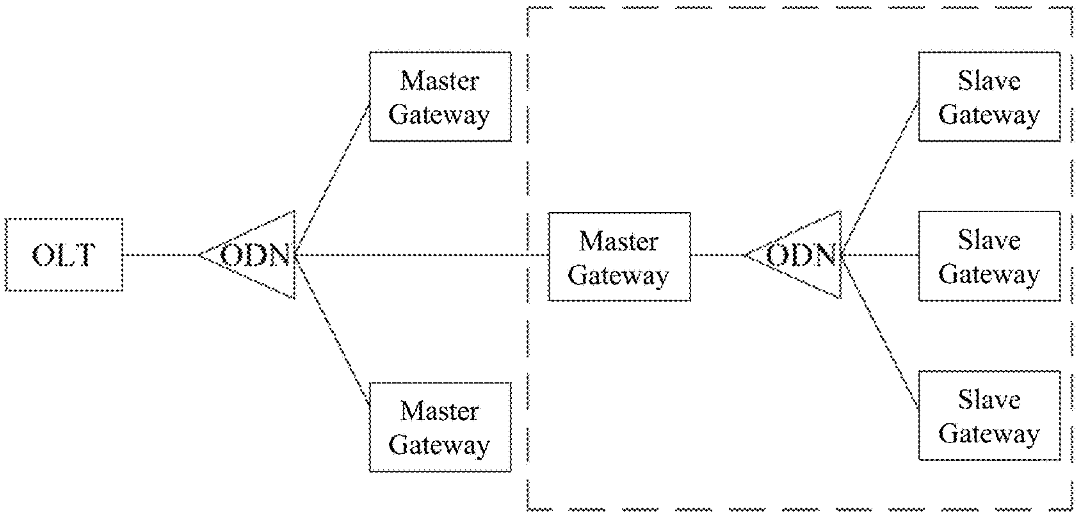
FIG. 9 depicts a schematic diagram showing a system of a home all-optical network according to another embodiment of the present disclosure.

FIG. 9 depicts a schematic diagram showing a system of a home all-optical network according to another embodiment of the present disclosure.

It can be understood that the OLT is connected with a plurality of master gateways through ODN. Each master gateway is connected through ODN to the corresponding slave gateway(s) deployed in a room. A master gateway is not only an ONU, but also has some functions of an OLT. A master gateway has two PON ports, i.e., an OLT PON port connected with the OLT, and an ONU PON port. A master gateway is served as an ordinary ONU to message transmission to and reception from the OLT. The ONU PON port is connected to the slave gateway(s) in the room. In such a case, the master gateway has some functions of an OLT.

Figure 10:
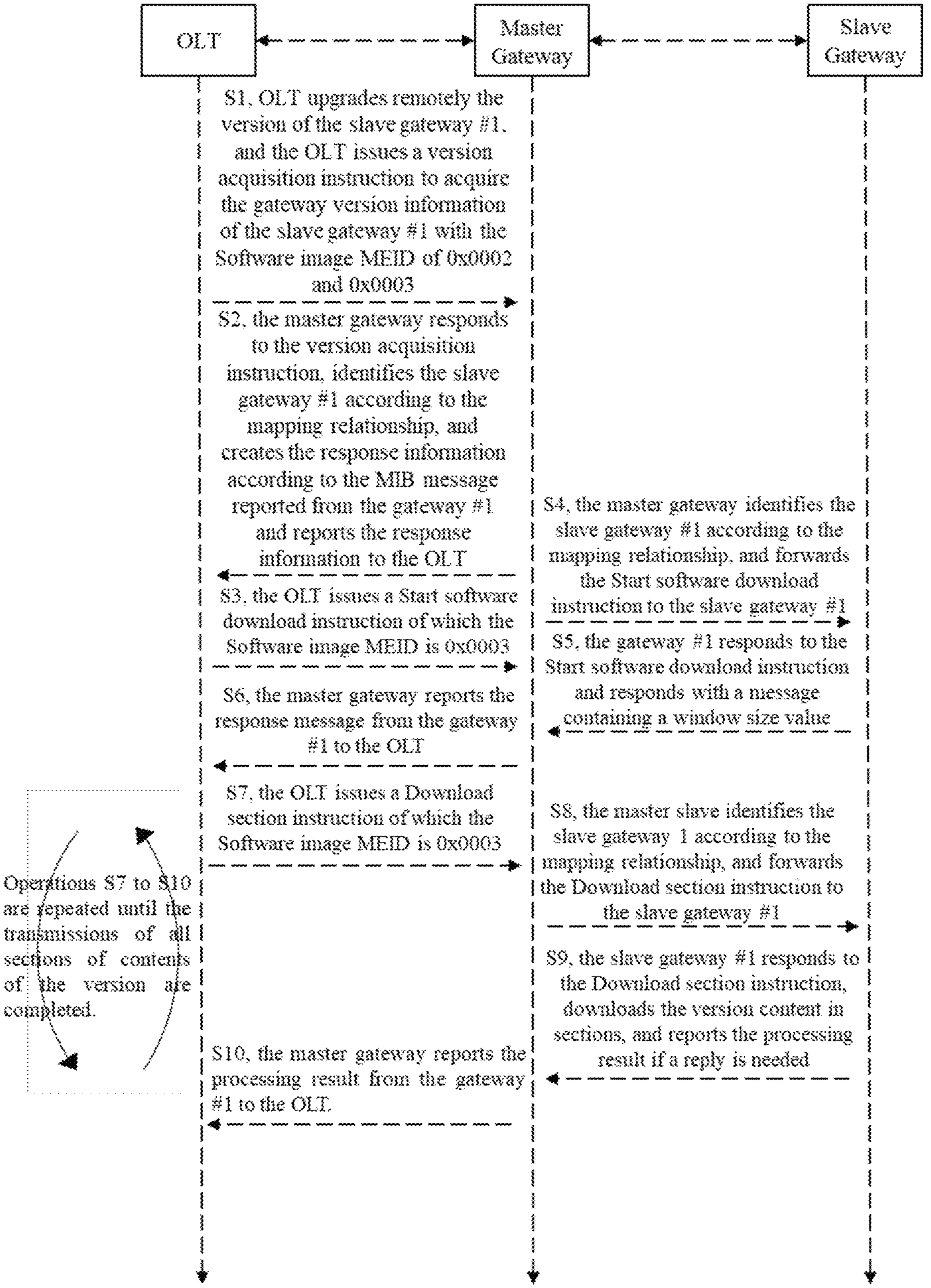
FIG. 10 depicts a flow chart showing a routine upgrade situation in a method for version upgrading of a gateway in home all-optical network according to another embodiment of the present disclosure.

FIG. 10 depicts a flow chart showing a routine upgrade situation in a method for version upgrading of a gateway in home all-optical network according to another embodiment of the present disclosure, which includes but is not limited to the following operations.

At operation S1, an OLT upgrades remotely the version of the slave gateway #1, and the OLT issues a version acquisition instruction to acquire the gateway version information of the slave gateway #1 with the Software image MEID of 0x0002 and 0x0003.

At operation S2, the master gateway responds to the version acquisition instruction, identifies the slave gateway #1 according to the mapping relationship, and creates the response information according to the MIB message reported from the slave gateway #1 and reports the response information to the OLT.

At operation S3, the OLT issues a Start software download instruction of which the Software image MEID is 0x0003.

At operation S4, the master gateway identifies the slave gateway #1 according to the mapping relationship, and forwards the Start software download instruction to the slave gateway #1.

At operation S5, the slave gateway #1 responds to the Start software download instruction and responds with a message containing a window size value.

At operation S6, the master gateway reports the response message from the gateway #1 to the OLT.

At operation S7, the OLT issues a Download section instruction of which the Software image MEID is 0x0003.

At operation S8, the master gateway identifies the slave gateway #1 according to the mapping relationship, and forwards the Download section instruction to the slave gateway #1.

At operation S9, the slave gateway responds to the Download section instruction, downloads the version content in sections, and reports the processing result if a reply is needed.

At operation S10, the master gateway reports the processing result from the slave gateway #1 to the OLT.

Operations S7 to S10 are repeated until the transmissions of all sections of contents of the version are completed.

It can be understood that when the master gateway enters the registration information of slave gateway #1, slave gateway #2, slave gateway #3 and slave gateway #4, the management entity identifiers of the software images assigned to the slave gateway #1, i.e., the software image MEIDs are 0x0002 and 0x0003, the software image MEIDs assigned to the slave gateway #2 are 0x0004 and 0x0005; the software image MEIDs assigned to the slave gateway #3 are 0x0006 and 0x0007, and the software image MEIDs assigned to the slave gateway #4 are 0x0008 and 0x0009. The OLT upgrades the four slave gateways respectively. For example, when upgrading the slave gateway #1, the OLT issues a Start software download instruction with a Software image MEID of 0x0003, i.e., a download initialization instruction to the master gateway which forward the instruction to the slave gateway. After determining the window size, the OLT issues version upgrade information about the sections (i.e., the Download section instruction) to the master gateway which forwards the instruction to the slave gateway. If all sections in an image window are successfully received by the slave gateway, an “confirmed” acknowledgement should be sent in the response information as a response to the Download section instruction. If not all the sections are successfully received, a “denial” acknowledgement should be sent instead. When all image windows are downloaded, the OLT sends an End software download instruction, which indicates that the version download is completed. For the slave gateway #1, the Software image ME corresponding to the Software image MEID of 0x0002 is in the active state, and the Software image ME corresponding to the Software image MEID of 0x0003 is in the standby state. The upgrade version information is firstly updated to the Software image ME in the standby state. When the slave gateway is in the standby state, the slave gateway updates the upgrade version information in the standby Software image ME to the activated Software image ME to complete the version upgrade of the slave gateway.

It should be noted that in operations S1 to S10, the slave gateway #1 remains online, and the OMCC channel has been established between the master gateway and the slave gateway #1.

Figure 11:
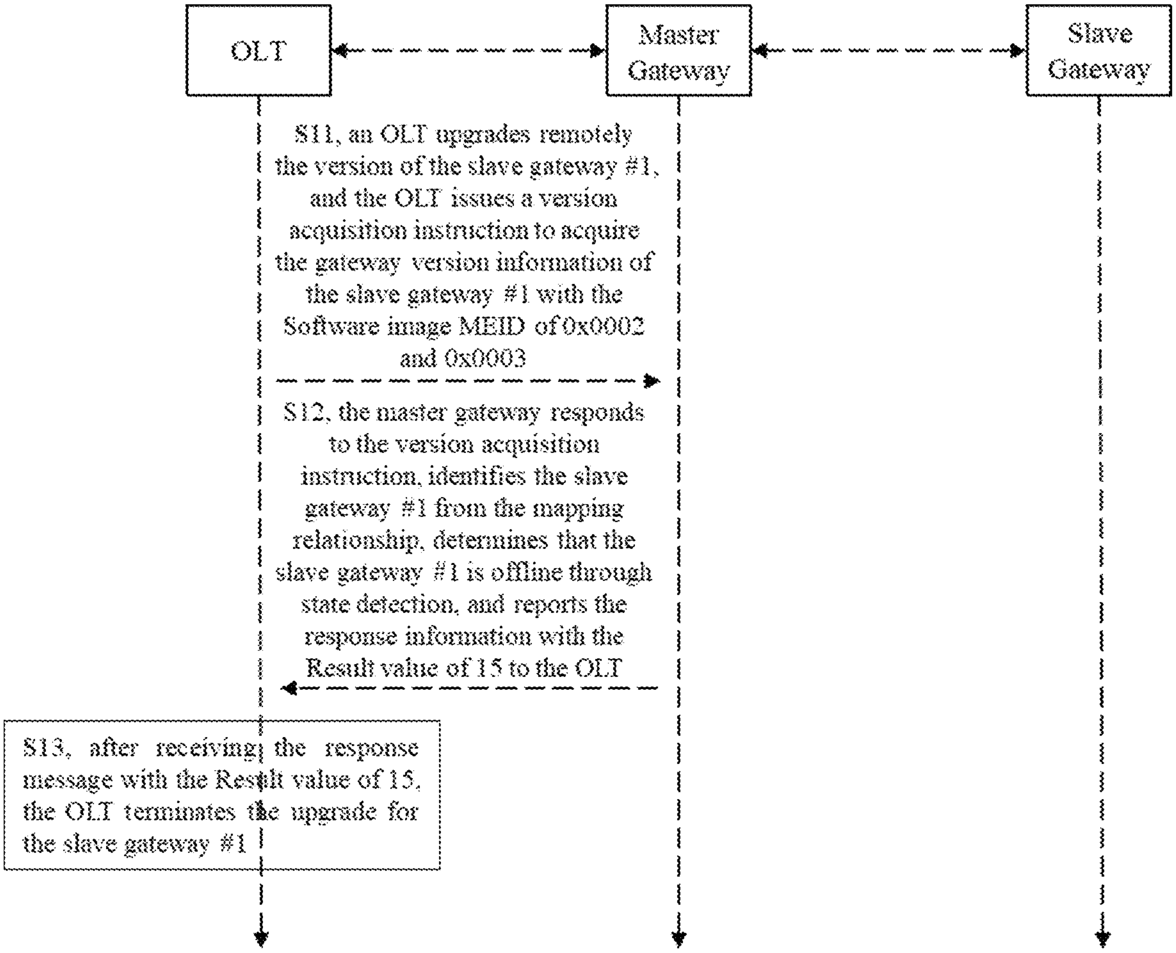
FIG. 11 depicts a flowchart showing a first situation of upgrade termination of a method for version upgrading of a gateway in home all-optical network according to another embodiment of the present disclosure.

FIG. 11 depicts a flow chart showing a first situation of upgrade termination in a method for version upgrading of a gateway in home all-optical network according to another embodiment of the present disclosure, which includes but is not limited to the following operations.

At operation S11, an OLT upgrades remotely the version of the slave gateway #1, and the OLT issues a version acquisition instruction to acquire the gateway version information of the slave gateway #1 with the Software image MEID of 0x0002 and 0x0003.

At operation S12, the master gateway responds to the version acquisition instruction, identifies the slave gateway #1 from the mapping relationship, determines that the slave gateway #1 is offline through state detection, and reports the response information with the Result value of 15 to the OLT.

At operation S13, after receiving the response message with the Result value of 15, the OLT terminates the upgrade for the slave gateway #1.

It can be understood that when the OLT issues the version acquisition instruction, the master gateway detects that the slave gateway #1 is offline, and reports the response information with the Result value of 15 to the OLT to terminate the upgrade of the slave gateway #1. The response information with the Result value of 15 is the first offline state code.

Figure 12:
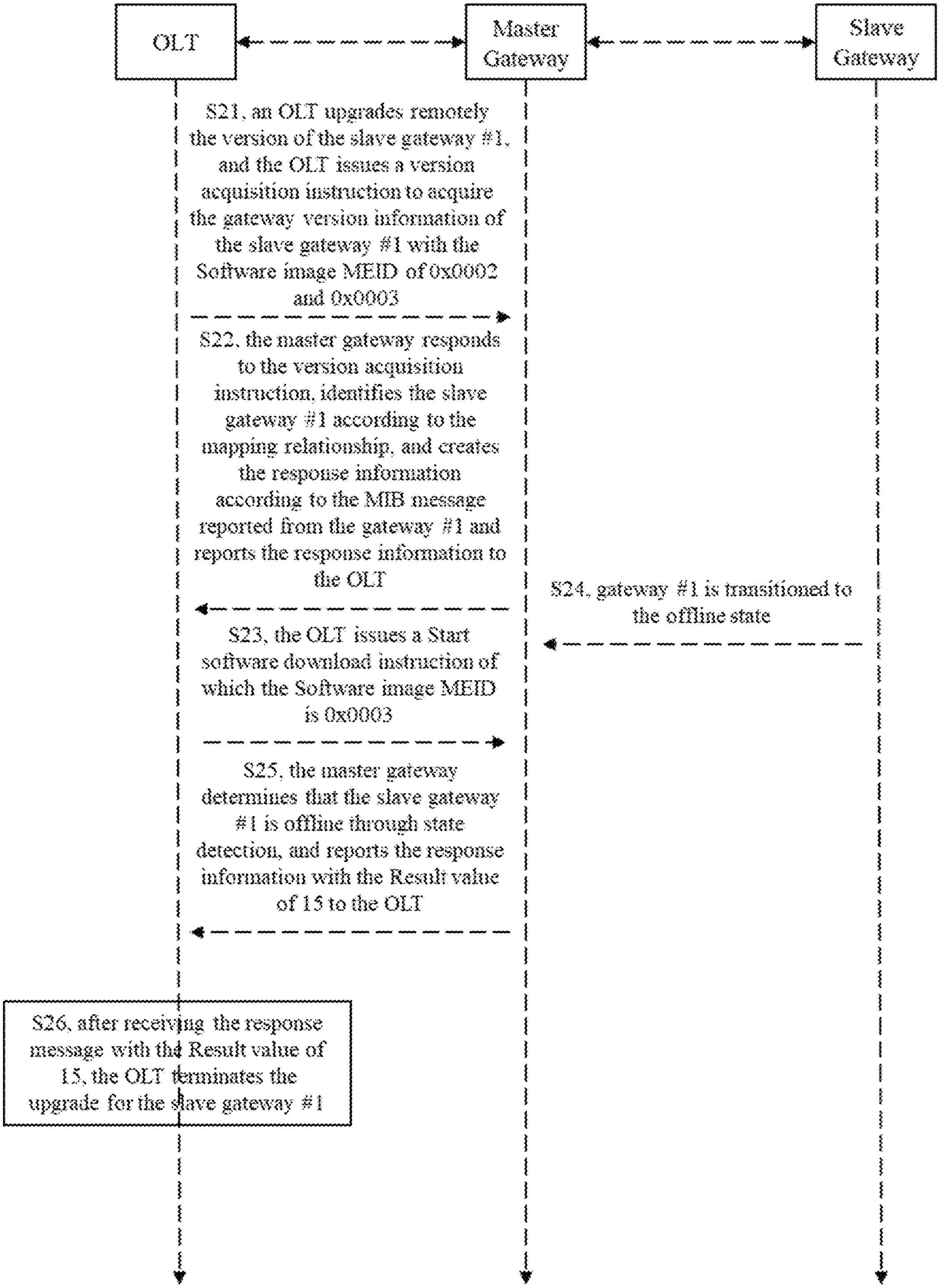
FIG. 12 depicts a flowchart showing a second situation of upgrade termination of a method for version upgrading of a gateway in home all-optical network according to another embodiment of the present disclosure.

FIG. 12 depicts a flow chart showing a second situation of upgrade termination in a method for version upgrading of a gateway in home all-optical network according to another embodiment of the present disclosure, which includes but is not limited to the following operations.

At operation S21, an OLT upgrades remotely the version of the slave gateway #1, and the OLT issues a version acquisition instruction to acquire the gateway version information of the slave gateway #1 with the Software image MEID of 0x0002 and 0x0003.

At operation S22, the master gateway responds to the version acquisition instruction, identifies the slave gateway #1 according to the mapping relationship, and creates the response information according to the MIB message reported from the slave gateway #1 and reports the response information to the OLT.

At operation S23, the OLT issues a Start software download instruction of which the Software image MEID is 0x0003.

At operation S24, the slave gateway #1 is transitioned to the offline state.

At operation S25, the master gateway determines that the slave gateway #1 is offline through state detection, and reports the response information with the Result value of 15 to the OLT.

At operation S26, after receiving the response message with the Result value of 15, the OLT terminates the upgrade for the slave gateway #1.

It can be understood that after the OLT issues the Start software download instruction, i.e., the download initialization instruction, and the master gateway detects that the slave gateway #1 is offline, the master gateway reports the response information with the Result value of 15 to the OLT to terminate the upgrade of the slave gateway #1, and the response information with the Result value of 15 is the second offline state code.

Figure 13:
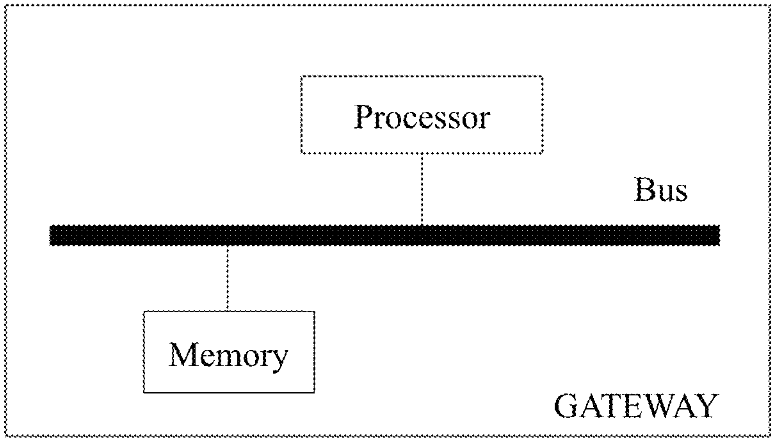
FIG. 13 depicts a schematic diagram showing a gateway according to another embodiment of the present disclosure.

According to an embodiment, as shown in FIG. 13, a gateway is provided.

The gateway includes one or more processors and one or more memories. FIG. 13 shows one processor and one memory by way of example. The processor and the memory may be connected by a bus or other means. The connection is shown as a bus by way of example in FIG. 13.

The memory, as a non-transient computer-readable storage medium, can be configured to store non-transitory software programs and non-transitory computer-executable programs, such as the method as described in any one of the embodiments above in the present disclosure, which is applied to a master gateway or a slave gateway. The processor executes the non-transitory software programs and instructions stored in the memory, such that the method as described in any one of the embodiments above is carried out, which is applied to a master gateway or a slave gateway.

The memory may include a program storage section and a data storage section, in which the program storage section may store an operating system and application programs for performing at least one operation, and data storage section may store program of the method as described in any one of the embodiments above, which is applied to a master gateway or a slave gateway. In addition, the memory may include high-speed random-access memory and non-transitory memory, such as at least one disk memory device, flash memory device, or other non-transitory solid-state memory devices. In some embodiments, the memory may include memories remotely located with respect to the processor, and these remote memories may be connected to the gateway through a network. Examples of the above networks include, but are not limited to, the Internet, intranet, local area network, mobile communication network, and combinations thereof.

Non-transitory software programs and programs required to implement the above-described method for version upgrading of a gateway in home all-optical network in any one of the embodiments of the present disclosure are stored in a memory which, when executed by one or more processors, cause the processors to carry out the method for version upgrading of a gateway in home all-optical network, which is applied to a master gateway, e.g., operations S110 to S150 described in conjunction with FIG. 1, operations S210 to S240 described in conjunction with FIG. 2, operations S310 to S330 described in conjunction with FIG. 3, operations S410 to S430 described in conjunction with FIG. 4, operations S510 to S530 described in conjunction with FIG. 5, or operations S610 to S630 described in conjunction with FIG. 6: determining a management entity identifier according to a software image management entity by a master gateway; where the software image management entity is created by preset registration information of a slave gateway, and the software image management entity is configured to store gateway version information of the slave gateway; sending the management entity identifier to an optical line terminal (OLT); receiving current gateway version information from the slave gateway, and mapping the current gateway version information to a corresponding software image management entity to update the software image management entity; determining response information, in response to a version acquisition instruction from the OLT, and sending the response information to the OLT, where the version acquisition instruction is determined by the OLT according to the management entity identifier, and the response information includes the current gateway version information and first state information indicative of a gateway state of the slave gateway; and receiving upgrade version information from the OLT, in response to an acknowledgement from the OLT that the response information meets a preset upgrade condition, and sending the upgrade version information to the slave gateway, to enable the slave gateway to perform an upgrade according to the upgrade version information. Alternatively, the non-transitory software programs and programs which, when executed by one or more processors, causes the processors to carry out the method for version upgrading of a gateway in home all-optical network, which is applied to a slave gateway, e.g., operations S810 to S830 described in conjunction with FIG. 8: sending current gateway version information to a master gateway by the slave gateway, to instruct the master gateway to map the current gateway version information to a corresponding software image management entity to update the software image management entity, where the software image management entity is created by the master gateway according to preset registration information of the slave gateway, and the software image management entity is configured to store the gateway version information of the slave gateway; receiving upgrade version information from the master gateway, in response to an acknowledgement from an optical line terminal (OLT) that response information meets a preset upgrade condition; where the response information is determined by the master gateway in response to a version acquisition instruction from the OLT, and the response information includes the current gateway version information, and first state information indicative of a gateway state of the slave gateway, and the version acquisition instruction is determined by the OLT according to the management entity identifier; and performing an upgrade according to the upgrading version information. On this basis, the OLT can determine whether the slave gateway meets the upgrade condition by a mapping of the current gateway version information of the slave gateway to the software image management entity created by the master gateway. If so, the upgrade version information is sent to the master gateway, and then is forwarded to the slave gateway. Thus, the remote version upgrade of the slave gateway in the home all-optical network is realized and the labor cost and time cost are reduced.

Figure 14:
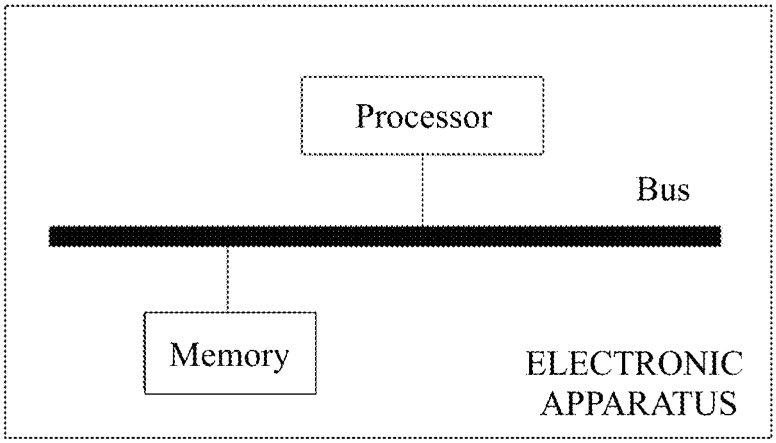
FIG. 14 depicts a schematic diagram of an electronic apparatus according to another embodiment of the present disclosure.

According to an embodiment, as shown in FIG. 14, an electronic apparatus is provided.

The apparatus includes one or more processors and one or more memories. FIG. 14 shows one processor and one memory by way of example. The processor and the memory may be connected by a bus or other means. The connection is shown as a bus by way of example in FIG. 14.

The memory, as a non-transient computer-readable storage medium, can be configured to store non-transitory software programs and non-transitory computer-executable programs, such as the method as described in any one of the embodiments above in the present disclosure, which is applied to an optical line terminal (OLT). The processor executes the non-transitory software programs and instructions stored in the memory, such that the method applied to an optical line terminal (OLT) as described in any one of the embodiments above is carried out.

The memory may include a program storage section and a data storage section, in which the program storage section may store an operating system and application programs for performing at least one operation, and data storage section may store program of the method applied to an optical line terminal (OLT) as described in any one of the embodiments above. In addition, the memory may include high-speed random-access memory and non-transitory memory, such as at least one disk memory device, flash memory device, or other non-transitory solid-state memory devices. In some embodiments, the memory may include memories remotely located with respect to the processor, and these remote memories may be connected to the electronic apparatus through a network. Examples of the above networks include, but are not limited to, the Internet, intranet, local area network, mobile communication network, and combinations thereof.

Non-transitory software programs and programs required to implement the above-described method for version upgrading of a gateway in home all-optical network in any one of the embodiments of the present disclosure, which is applied to an optical line terminal (OLT), are stored in a memory which, when executed by one or more processors, cause the processors to carry out the method for version upgrading of a gateway in home all-optical network, which is applied to an optical line terminal (OLT), e.g., operations 710 to 740 described in conjunction with FIG. 7: acquiring a management entity identifier by the OLT from a master gateway; where the management entity identifier is determined by a software image management entity, the software image management entity is created by the master gateway according to preset registration information of a slave gateway, and the software image management entity is configured to store gateway version information of the slave gateway. The software image management entity is updated by the master gateway receiving current gateway version information from the slave gateway, and mapping the current gateway version information to the corresponding software image management entity. A version acquisition instruction is determined according to the management entity identifier. The version acquisition instruction is sent to the master gateway to acquire response information from the master gateway, where the response information includes the current gateway version information and first state information indicative of a gateway state of the slave gateway. Preset upgrade version information is sent to the master gateway, in response to a determination that the response information meets a preset upgrade condition, to instruct the master gateway to send the upgrade version information to the slave gateway, and to instruct the slave gateway to perform an upgrade according to the upgrade version information. On this basis, the OLT can determine whether the slave gateway meets the upgrade condition by a mapping of the current gateway version information of the slave gateway to the software image management entity created by the master gateway. If so, the upgrade version information is sent to the master gateway, and then is forwarded to the slave gateway. Thus, the remote version upgrade of the slave gateway in the home all-optical network is realized and the labor cost and time cost are reduced.

According to an embodiment, a computer-readable storage medium is provided. The computer-readable storage medium stores thereon, computer-executable instructions which, when executed by one or more processors and controllers, e.g., one processor arranged in the electronic apparatus discussed above, cause the processors to carry out the method for version upgrading of a gateway in home all-optical network, which is applied to a master gateway, e.g., operations S110 to S150 described in conjunction with FIG. 1, operations S210 to S240 described in conjunction with FIG. 2, operations S310 to S330 described in conjunction with FIG. 3, operations S410 to S430 described in conjunction with FIG. 4, operations S510 to S530 described in conjunction with FIG. 5, or operations S610 to S630 described in conjunction with FIG. 6: determining a management entity identifier according to a software image management entity; where the software image management entity is created by preset registration information of a slave gateway, and the software image management entity is configured to store gateway version information of the slave gateway; sending the management entity identifier to an optical line terminal (OLT); receiving current gateway version information from the slave gateway, and mapping the current gateway version information to a corresponding software image management entity to update the software image management entity; determining response information, in response to a version acquisition instruction from the OLT, and sending the response information to the OLT, where the version acquisition instruction is determined by the OLT according to the management entity identifier, and the response information includes the current gateway version information and first state information indicative of a gateway state of the slave gateway; and receiving upgrade version information from the OLT, in response to an acknowledgement from the OLT that the response information meets a preset upgrade condition, and sending the upgrade version information to the slave gateway, to enable the slave gateway to perform an upgrade according to the upgrade version information. Alternatively, the computer-executable instructions, when are executed by one or more processors, cause the processors to carry out the method for version upgrading of a gateway in home all-optical network, which is applied to an OLT, e.g., operations S710 to S740 described in conjunction with FIG. 7, or the method for version upgrading of a gateway in home all-optical network, which is applied to a slave gateway, e.g., operations S810 to S830 described in conjunction with FIG. 8. On this basis, the OLT can determine whether the slave gateway meets the upgrade condition by a mapping of the current gateway version information of the slave gateway to the software image management entity created by the master gateway. If so, the upgrade version information is sent to the master gateway, and then is forwarded to the slave gateway. Thus, the remote version upgrade of the slave gateway in the home all-optical network is realized and the labor cost and time cost are reduced.

It shall be appreciated by a person having ordinary skills in the art that all or some of the operations and systems disclosed above can be implemented as software, firmware, hardware and their appropriate combinations. Some or all physical components can be implemented as software executed by a processor, such as a central processing unit, a digital signal processor or a microprocessor, or as hardware, or as an integrated circuit, such as an application specific integrated circuit. Such software can be distributed on computer-readable media, which can include computer storage media (or non-transitory media) and communication media (or transitory media). As is well known to a person having ordinary skills in the art, the term computer storage medium includes volatile and nonvolatile, removable and non-removable medium implemented in any method or technology for storing information such as computer readable instructions, data structures, program modules or other data. Computer storage medium includes, but is not limited to, RAM, ROM, EEPROM, flash memory or other memory technologies, CD-ROM, digital versatile disks (DVD) or other optical disk storage, magnetic boxes, tapes, magnetic disk storage or other magnetic storage devices, or any other medium that can be configured to store desired information and accessible by a computer. Furthermore, it is well known to those having ordinary skills in the art that communication media usually contains computer-readable instructions, data structures, program modules or other data in modulated data signals such as carrier waves or other transmission mechanisms, and can include any information delivery media.

Described above is a description for several embodiments of the present disclosure, but the present disclosure is not limited to the above embodiments. Those having ordinary skills in the art can make various equivalent modifications or substitutions without departing the scope of the present disclosure, and these equivalent modifications or substitutions are within the scope defined by the claims of the present disclosure.

What is claimed is:

1. A method for version upgrading of a gateway in home all-optical network, which is applied to a master gateway, the method comprising:

determining a management entity identifier according to a software image management entity; wherein the software image management entity is created by preset registration information of a slave gateway, and the software image management entity is configured to store gateway version information of the slave gateway;

sending the management entity identifier to an optical line terminal (OLT);

receiving current gateway version information from the slave gateway, and mapping the current gateway version information to a corresponding software image management entity to update the software image management entity;

determining response information, in response to a version acquisition instruction from the OLT, and sending the response information to the OLT; wherein the version acquisition instruction is determined by the OLT according to the management entity identifier, and the response information comprises the current gateway version information and first state information indicative of a gateway state of the slave gateway; and receiving upgrade version information from the OLT, in response to an acknowledgement from the OLT that the response information meets a preset upgrade condition, and sending the upgrade version information to the slave gateway, to enable the slave gateway to perform an upgrade according to the upgrade version information.

2. The method according to claim 1, wherein after determining the management entity identifier according to the software image management entity, the method comprises:

determining a mapping relationship between the registration information and the management entity identifier.

3. The method according to claim 2, wherein determining the response information, in response to the version acquisition instruction from the OLT, and sending the response information to the OLT comprises:

determining a target management entity identifier in response to the version acquisition instruction from the OLT;

identifying a target slave gateway according to the target management entity identifier and based on the mapping relationship;

determining the response information according to the target slave gateway and the software image management entity; and sending the response information to the OLT.

4. The method according to claim 1, wherein receiving the current gateway version information from the slave gateway and mapping the current gateway version information to the corresponding software image management entity to update the software image management entity comprises:

receiving a management information base from the slave gateway, wherein the management information base comprises a synchronization counter value and current gateway version information;

performing synchronization on the slave gateway based on the synchronization counter value, wherein the synchronization is intended for synchronizing the synchronization counter value of the slave gateway with the synchronization counter value of the master gateway; and mapping the current gateway version information to the corresponding software image management entity to update the software image management entity.

5. The method according to claim 1, wherein the gateway state of the slave gateway comprises an online state and an offline state, and the first state information comprises a first online state code and a first offline state code; and determining the response information, in response to the version acquisition instruction from the OLT, and sending the response information to the OLT comprises:

performing state detection on the slave gateway to determine the first state information, in response to the version acquisition instruction from the OLT;

sending the first online state code and the current gateway version information to the OLT, in response to a determination that the gateway state of the slave gateway is the online state; and sending the first offline state code to the OLT in response to a determination that the gateway state of the slave gateway is the offline state, to instruct the OLT to terminate the upgrade of the slave gateway.

6. The method according to claim 5, wherein the upgrade condition comprises a difference of the current gateway version information with the upgrade version information, and the reception by the OLT of the first online state code from the master gateway.

7. The method according to claim 1, wherein the gateway state of the slave gateway comprises an online state and an offline state, and before receiving the upgrade version information from the OLT, in response to the acknowledgement from the OLT that the response information meets the preset upgrade condition, and sending the upgrade version information to the slave gateway to enable the slave gateway to perform the upgrade according to the upgrade version information, the method comprises:

performing state detection on the slave gateway responsive to a download initialization instruction from the OLT to determine second state information, in response to the acknowledgement from the OLT that the response information meets the preset upgrade condition; wherein, the download initialization instruction is determined by the OLT based on the response information, and the second state information is indicative of a gateway state of the slave gateway, and comprises a second online state code and a second offline state code;

sending the second offline state code to the OLT in response to a determination that the gateway state of the slave gateway is the offline state, to instruct the OLT to terminate the upgrade for the slave gateway; and sending the download initialization instruction to the slave gateway to acquire initialization information from the slave gateway, in response to a determination that the gateway state of the slave gateway is the online state; and sending the second online state code and the initialization information to the OLT, to perform operations of, receiving the upgrade version information from the OLT, in response to the acknowledgement from the OLT that the response information meets the preset upgrade condition, and sending the upgrade version information to the slave gateway, to enable the slave gateway to perform the upgrade according to the upgrade version information.

8. The method according to claim 1, wherein before receiving the current gateway version information from the slave gateway and mapping the current gateway version information to the corresponding software image management entity to update the software image management entity, the method comprises:

sending a verification request instruction to the slave gateway to acquire registration verification information from the slave gateway;

comparing the registration information with the registration verification information to determine a legitimate state of the slave gateway; and performing operations of, receiving the current gateway version information from the slave gateway and mapping the current gateway version information to the corresponding software image management entity to update the software image management entity, in response to a determination that the slave gateway is in the legitimate state.

9. A gateway, comprising a memory, a processor and a computer program stored in the memory and executable by the processor which, when executed by the processor causes the processor to carry out the method of claim 1.

10. A non-transitory computer-readable storage medium storing a computer-executable program which, when executed by a computer, causes the computer to carry out the method as claimed in claim 1.

11. A gateway, comprising a memory, a processor and a computer program stored in the memory and executable by the processor which, when executed by the processor causes the processor to carry out the method of claim 8.

12. A non-transitory computer-readable storage medium storing a computer-executable program which, when executed by a computer, causes the computer to carry out the method as claimed in claim 8.

13. A method for version upgrading of a gateway in home all-optical network, which is applied to an optical line terminal (OLT), the method comprising:

acquiring a management entity identifier from a master gateway; wherein the management entity identifier is determined by a software image management entity, the software image management entity is created by the master gateway according to preset registration information of a slave gateway, an the software image management entity is configured to store gateway version information of the slave gateway, the software image management entity is updated by the master gateway receiving current gateway version information from the slave gateway, and mapping the current gateway version information to the corresponding software image management entity;

determining a version acquisition instruction according to the management entity identifier;

sending the version acquisition instruction to the master gateway to acquire response information from the master gateway, wherein the response information comprises the current gateway version information and first state information indicative of a gateway state of the slave gateway; and sending preset upgrade version information to the master gateway, in response to a determination that the response information meets a preset upgrade condition, to instruct the master gateway to send the upgrade version information to the slave gateway, and to instruct the slave gateway to perform an upgrade according to the upgrade version information.

14. An electronic apparatus, comprising a memory, a processor and a computer program stored in the memory and executable by the processor which, when executed by the processor causes the processor to carry out the method as claimed in claim 13.

15. A non-transitory computer-readable storage medium storing a computer-executable program which, when executed by a computer, causes the computer to carry out the method as claimed in claim 13.

16. A method for version upgrading of a gateway in home all-optical network, which is applied to a slave gateway, the method comprising:

sending current gateway version information to a master gateway, to instruct the master gateway to map the current gateway version information to a corresponding software image management entity to update the software image management entity, wherein the software image management entity is created by the master gateway according to preset registration information of the slave gateway, and the software image management entity is configured to store the gateway version information of the slave gateway;

receiving upgrade version information from the master gateway, in response to an acknowledgement from an optical line terminal (OLT) that response information meets a preset upgrade condition; wherein the response information is determined by the master gateway in response to a version acquisition instruction from the OLT, and the response information comprises the current gateway version information, and first state information indicative of a gateway state of the slave gateway, and the version acquisition instruction is determined by the OLT according to the management entity identifier; and performing an upgrade according to the upgrading version information.

17. A gateway, comprising a memory, a processor and a computer program stored in the memory and executable by the processor which, when executed by the processor causes the processor to carry out the method of claim 16.

18. A non-transitory computer-readable storage medium storing a computer-executable program which, when executed by a computer, causes the computer to carry out the method as claimed in claim 16.

* * * * *